US011866974B2

(12) United States Patent
Hall

(10) Patent No.: US 11,866,974 B2
(45) Date of Patent: Jan. 9, 2024

(54) HINGE

(71) Applicant: KINGSWAY ENTERPRISES (UK) LIMITED, Swanley (GB)

(72) Inventor: Benjamin Hall, Swanley (GB)

(73) Assignee: Kingsway Enterprises (UK) Limited, Kent (GB)

(*) Notice: Subject to any disclaimer, the term of this patent is extended or adjusted under 35 U.S.C. 154(b) by 0 days.

(21) Appl. No.: 17/989,142

(22) Filed: Nov. 17, 2022

(65) Prior Publication Data

US 2023/0080352 A1 Mar. 16, 2023

Related U.S. Application Data

(63) Continuation of application No. 17/174,411, filed on Feb. 12, 2021, now Pat. No. 11,566,457.

(30) Foreign Application Priority Data

Feb. 14, 2020 (GB) ...................................... 2002074
Feb. 10, 2021 (GB) ...................................... 2101829

(51) Int. Cl.
*E05D 3/02* (2006.01)

(52) U.S. Cl.
CPC .......... *E05D 3/02* (2013.01); *E05D 2003/025* (2013.01); *E05Y 2900/132* (2013.01)

(58) Field of Classification Search
CPC ................ E05D 3/02; E05D 2003/025; E05Y 2900/132; Y10T 16/531; Y10T 16/558
See application file for complete search history.

(56) References Cited

U.S. PATENT DOCUMENTS 1,785,362 A * 12/1930 Regan ........................ E05D 3/02 16/234
2,000,856 A * 5/1935 Lyons ........................ E05D 5/04 16/276
2,112,878 A * 4/1938 Holt .......................... E05D 3/02 16/356
3,479,683 A * 11/1969 Hull .......................... E05D 3/02 16/263
3,811,150 A * 5/1974 Chalmers ............ E05D 11/1007 16/389

(Continued)

FOREIGN PATENT DOCUMENTS

CN 207513413 U 6/2018
FR 2627539 8/1989

(Continued)

OTHER PUBLICATIONS

Great Britain Patent Application 2002074.9 Combined Search and Examination Report dated Aug. 3, 2020.

(Continued)

*Primary Examiner* — Victor D Batson
*Assistant Examiner* — Matthew J Sullivan
(74) *Attorney, Agent, or Firm* — Erise IP, P.A.

(57) ABSTRACT

Disclosed herein is a continuous hinge. The continuous hinge comprises a first hinge portion comprising a first plurality of knuckles; and a second hinge portion opposing the first hinge portion and comprising a second plurality of knuckles. The second plurality of knuckles is interdigitated with the first plurality of knuckles and pivotally coupled to the first plurality of knuckles. Each knuckle is a separate piece.

10 Claims, 13 Drawing Sheets

(56) References Cited

U.S. PATENT DOCUMENTS

| | | | | | |
|---|---|---|---|---|---|
| 3,991,436 | A * | 11/1976 | Nagase | E05D 11/00 | 16/273 |
| 4,129,163 | A | 12/1978 | Johnson | | |
| 4,203,227 | A * | 5/1980 | Giroux | E04F 21/04 | 33/DIG. 1 |
| 4,400,847 | A * | 8/1983 | Farber | F24S 25/10 | 16/265 |
| 4,922,987 | A | 5/1990 | Marontate et al. | | |
| 5,062,181 | A * | 11/1991 | Bobrowski | E05D 3/122 | 16/234 |
| 5,107,639 | A * | 4/1992 | Morin | E04B 1/3445 | 220/6 |
| 5,150,501 | A | 9/1992 | Pasternak | | |
| 5,409,306 | A | 4/1995 | Bentz et al. | | |
| 5,490,306 | A * | 2/1996 | Floyd | E05D 11/0018 | 16/250 |
| 5,590,922 | A * | 1/1997 | Hucknall | E05C 3/048 | 292/202 |
| 6,253,525 | B1 * | 7/2001 | Weber | B62D 25/04 | 52/843 |
| 6,389,643 | B1 * | 5/2002 | Lim | G06F 1/1681 | 16/DIG. 43 |
| 7,290,310 | B2 * | 11/2007 | Yamaguchi | E05D 5/10 | 16/234 |
| 8,967,738 | B2 * | 3/2015 | Blase | A61P 9/00 | 211/144 |
| 10,125,527 | B2 * | 11/2018 | Smalls | E05D 7/009 | |
| 10,316,559 | B2 * | 6/2019 | Kenerly | E05D 3/02 | |
| 10,946,233 | B1 * | 3/2021 | Neeley, Jr. | A63B 21/1663 | |
| 11,111,709 | B1 * | 9/2021 | Santa | E05D 7/0009 | |
| 2007/0220707 | A1 * | 9/2007 | Eldon | E05D 11/0018 | 16/221 |
| 2015/0052706 | A1 * | 2/2015 | Kalis | E05D 5/04 | 16/224 |
| 2016/0040463 | A1 * | 2/2016 | Gramstad | E05D 5/128 | 16/382 |
| 2016/0237729 | A1 * | 8/2016 | Kohlweiss | E05D 3/02 | |
| 2017/0089122 | A1 * | 3/2017 | Lewis | E06B 3/481 | |
| 2018/0187465 | A1 * | 7/2018 | Bertovic | E05D 5/04 | |
| 2018/0245383 | A1 * | 8/2018 | Jeffries | E05C 3/008 | |
| 2019/0000285 | A1 * | 1/2019 | Xu | E05D 7/12 | |
| 2020/0032565 | A1 * | 1/2020 | Culp | E04F 11/1836 | |
| 2021/0115716 | A1 * | 4/2021 | Watanabe | B64C 1/1461 | |
| 2021/0387714 | A1 * | 12/2021 | Nakao | B64D 11/02 | |

FOREIGN PATENT DOCUMENTS

| | | | |
|---|---|---|---|
| FR | 2638778 | | 5/1990 |
| GB | 2160257 | A | 12/1985 |
| GB | 2516093 | A | 1/2016 |
| GB | 2535637 | A | 8/2016 |
| JP | 10331506 | | 12/1998 |
| KR | 1020140102858 | A | 8/2014 |

OTHER PUBLICATIONS

Great Britain Patent Application 2200906.2 Combined Search and Examination Report dated Mar. 14, 2022.

Great Britain Patent Application 2101829.6 Examination Report dated Mar. 14, 2022.

Great Britain Patent Application 2101829.6 Search Report dated Jul. 21, 2021.

Great Britain Patent Application 2200906.2 Search Report dated Mar. 11, 2022.

* cited by examiner

HINGE

RELATED APPLICATIONS

This application is a continuation of U.S. patent application Ser. No. 17/174,411, filed Feb. 12, 2021, which claims priority to Great Britain Patent Application No. 2002074.9, filed Feb. 14, 2020, and Great Britain Patent Application No. 2101829.6, filed Feb. 10, 2021, the disclosures of which are incorporated herein by reference.

FIELD

The present disclosure relates to a continuous hinge, and to a method of manufacturing continuous hinges.

BACKGROUND

Continuous hinges, for example of the type disclosed in GB2516093, are known. Continuous hinges are elongate, with interdigitated knuckles that run the full length of the hinge. Continuous hinges are robust, and are therefore of particular use in high-security environments. Additionally, because there are no gaps between adjacent knuckles, continuous hinges do not to include anchor points upon which clothing or body parts could become snagged, or around which a rope or cable could be secured to create a ligature. Continuous hinges are therefore also of particular use in environments in which users may be vulnerable.

However, the manufacture of continuous hinges, such as the continuous hinge disclosed in GB2516093, can be expensive, wasteful, and environmentally damaging. This is particularly the case where continuous hinges are constructed from materials that confer robustness, such as metal.

There is demand for a continuous hinge whose construction and manufacture is inexpensive and environmentally considerate, without sacrificing on robustness and safety.

SUMMARY

The inventor of the subject matter disclosed in the present application has found that waste material, and lack of versatility (individual continuous hinges are often designed for specific purposes, and thus cannot be used in a wide variety of applications), are significant factors contributing to the high financial and environmental manufacturing costs discussed in the background section above. The inventor has developed a continuous hinge whose manufacture is simple and reduces material waste, and which is capable of being modified for specific purposes.

At its most general, the present disclosure provides a continuous hinge of modular construction.

In a first aspect, the present disclosure provides a continuous hinge comprising: a first hinge portion comprising a first plurality of knuckles attached to a first spine; and a second hinge portion comprising a second plurality of knuckles attached to a second spine, the second plurality of knuckles being interdigitated with the first plurality of knuckles and pivotally coupled to the first plurality of knuckles; wherein attachment between the first spine and the first plurality of knuckles comprises a first sliding joint. Attachment between the second spine and the second plurality of knuckles may comprise a second sliding joint. The first sliding joint may comprise: one of a tail and a corresponding socket extending along the spine; and the other of the tail and the corresponding socket extending along each of the knuckles. The second sliding joint may be similarly configured. For example, the or each sliding joint may be a sliding dovetail joint.

The or each sliding joint may be a joint by which the relevant spine and knuckles can be fitted together by sliding in a first direction (e.g. axial direction) such that they are jointed to resist separation in a second direction (e.g. transverse direction). The second direction may be substantially perpendicular to the first direction. An example of this is a dovetail joint. Other, functionally equivalent or similar joints are also envisaged. The first direction maybe substantially parallel to the rotational axis of the hinge. The rotational axis is the axis about which the first hinge portion and the section hinge portion rotate relative to each other.

In a second aspect, the present disclosure provides a continuous hinge comprising: a first hinge portion comprising a first plurality of knuckles; and a second hinge portion comprising a second plurality of knuckles, the second plurality of knuckles being interdigitated with the first plurality of knuckles and pivotally coupled to the first plurality of knuckles; wherein each knuckle is a separate piece.

Where each knuckle is a separate piece (i.e. because the knuckles are modular parts), no machining step is required to fabricate the first plurality of knuckles, or the second plurality of knuckles. In contrast, a machining step is required to form the knuckles of GB2516093. In particular, material has to be removed (machined) from a first hinge block to produce a first plurality of knuckles in GB2516093; and material has to be removed (machined) from a second hinge block to produce a second plurality of knuckles in GB2516093. This machining process wastes material. The modular construction of the continuous hinge disclosed herein reduces waste material.

Where attachment between the spine and the knuckles of a hinge portion comprises a sliding joint, the spine(s) can be easily replaced or changed as required for secure attachment to a door leaf or a door frame having a particular configuration. Therefore, the continuous hinge can be easily adapted as required for secure attachment to a variety of door leaves and door frames, without having to replace the continuous hinge altogether. In other words, the hinge can be modified for specific purposes—it is versatile. Because the hinge can be modified for different purposes, rather than having to be replaced entirely, wastage is reduced. Also, robustness of the continuous hinge is still ensured, because the use of a dovetail joint ensures that separation of the spine from the knuckles is prevented.

Each knuckle may comprise a generally cylindrical barrel. Each knuckle may further comprise an attachment portion extending from the generally cylindrical barrel, the attachment portion including an attachment surface for attachment to its respective spine. The attachment surface may be located on a plane that is displaced from a bore of the generally cylindrical barrel. Alternatively, the attachment surface may be located on a plane that passes through or adjacent to the bore of the generally cylindrical barrel.

A pin may pass through the knuckles, for example through the bores of the knuckles. The pin may extend from a first end of the continuous hinge, to a second end of the continuous hinge. The pin may be cylindrical. It may be formed of metal, for example steel, for example stainless steel. The continuous hinge may also comprise at least one bushing between at least one pair of, a plurality of pairs of, or each pair of adjacent knuckles.

For example, each knuckle may comprise at least one bushing configured not to rotate relative to the knuckle. For example, a bushing may be inserted into each axial end of each knuckle. Each bushing may comprise a tubular portion extending into the knuckle, and a flange portion in abutment with the respective axial end of the knuckle into which the bushing is inserted. The knuckles and bushings may be configured to prevent rotation relative to one another. For example, the bore of each knuckle may comprise a flat portion. Each bushing may be provided with a corresponding flat portion, such that the flat portion of each bushing engages the flat portion of the bore into which it is inserted. Accordingly, rotation of the bushing relative to the knuckle is prevented. The tubular portion of each bushing may be configured for a snug fit within the bore.

Each bushing may be rotatable relative to the pin. For example, the tubular portion of each bushing may have an inner diameter that substantially matches an outer diameter of the cylindrical pin. The inner surface of the tubular portion may have a circular cross-section, substantially matching the cross-section of the cylindrical pin.

The flange portion of each bushing may sit flush with an outer surface of the knuckle into which it is inserted. For example, the flange portion of each bushing may have an outer diameter that substantially matches the outer diameter of each knuckle (e.g. that substantially matches the outer diameter of the barrel of each knuckle).

The first hinge portion may further comprise a first spine attached to the first plurality of knuckles. And the second hinge portion may further comprise a second spine attached to the second plurality of knuckles. Accordingly, co-alignment of the first plurality of knuckles is maintained by the first spine. And co-alignment of the second plurality of knuckles is maintained by the second spine. The first spine may be for attachment to a door frame, or to a door leaf. The second spine may also be for attachment to a door leaf, or to a door frame.

Attachment between the first spine and each of the first plurality of knuckles may comprise a first sliding joint. The first sliding joint extends along a length of the first hinge portion. The first sliding joint may comprise at least one socket extending along a length of the first spine; and a corresponding at least one tail along the attachment surface of each of the first plurality of knuckles. In an example, the first sliding joint comprises a pair of parallel sockets extending along the length of the first spine; and further comprises a corresponding pair of parallel tails extending along the attachment surface of each of the first plurality of knuckles. But as the skilled person will understand, the first spine may comprise at least one tail, and each of the second plurality of knuckles may comprise a corresponding at least one socket.

In some examples, the tail(s) of the first sliding joint may have sloped side-surfaces that each form an acute angle with the attachment surface from which they extend. That is to say, each tail may be narrower at its interface with the attachment surface than it is at a distance from its interface with the attachment surface. For example, they may have a dovetail shape, such that the first sliding joint is a sliding dovetail joint.

The first sliding joint may comprise one of a socket and a corresponding tail extending along the length of the spine, and the other of the socket and the corresponding tail extending along each of the first plurality of knuckles. For example, the socket may extend along the length of the spine, and a corresponding tail may extend along the attachment surface of each of the first plurality of knuckles. Each tail may be curved so as to bend back on itself. For example, each tail may comprise a stem radially extending from the knuckle, and at least one finger which bends back towards the knuckle, such that the finger forms an acute angle with the stem. For example, each tail may comprise a pair of fingers, arranged on opposing sides of the stem from one another. The socket may have a corresponding shape, such that the tail is slidable into the socket. The second sliding joint may be similarly configured.

In the assembled continuous hinge, each knuckle may be secured in place by at least one screw, pin, or rivet extending through the respective spine and into the knuckle. The screw, pin, or rivet may be transversely oriented (e.g. oriented substantially perpendicular to the pin). The screw, pin, or rivet may extend through the spine, and into the tail of the knuckle. The screw, pin or rivet may prevent the knuckle from sliding relative to the spine.

Similarly, attachment between the second spine and each of the second plurality of knuckles may comprise a second sliding joint. The second sliding joint extends along a length of the second hinge portion. The second sliding joint may comprise at least one socket extending along a length of the second spine; and a corresponding at least one tail along the attachment surface of each of the second plurality of knuckles. In an example, the second sliding joint comprises a pair of parallel sockets extending along the length of the second spine; and further comprises a corresponding pair of parallel tails extending along the attachment surface of each of the first plurality of knuckles. But as the skilled person will understand, the second spine may comprise the at least one tail, and each of the second plurality of knuckles may comprise a corresponding at least one socket.

In some examples, the tail(s) of the second sliding joint may have sloped side-surfaces that each form an acute angle with the attachment surface from which they extend. That is to say, each tail may be narrower at its interface with the attachment surface than it is at a midpoint displaced from its interface with the attachment surface. For example, they may have a dovetail shape, such that the second sliding joint is a sliding dovetail joint.

The use of a dovetail joint prevents separation of the continuous hinge, thereby ensuring robustness of the continuous hinge.

At least one of the first spine and the second spine may comprise a c-shaped portion for receiving a door leaf. The c-shaped portion may comprise two parallel walls for receiving a door leaf therebetween. A separation distance between the first wall and the second wall may be ¾ inch. In some examples, both the first spine and the second spine may comprise such a c-shaped portion. The use of a c-shaped portion ensures that gaps between the continuous hinge and a door leaf (or door leaves) to which it is attached are eliminated. The or each c-shaped portion may be on an opposite side of the respective spine from the respective dovetail joint.

Alternatively, the spine may comprise a flat plate.

Each spine may comprise a concave abutment surface configured to engage the knuckles of the opposing hinge portion, so as to support rotation of the first hinge portion relative to the second hinge portion while eliminating ligature points. For example, the first spine may comprise a concave abutment surface configured to engage the curved outer surface of each of the second plurality of knuckles (e.g. the curved outer surface of the cylindrical barrel of each of the knuckles); and the second spine may comprise a concave abutment surface configured to engage the curved outer surface of each of the first plurality of knuckles (e.g. the curved outer surface of the cylindrical barrel of each of the knuckles). The concave abutment surface may extend the full length of each spine. The concave abutment surface may have a radius of curvature that substantially matches the radius of curvature of the knuckles. For example, the concave abutment surface may have a radius of curvature that is slightly larger than the radius of curvature of the knuckles, for example less than 5% larger than the radius of curvature of the knuckles. Accordingly, rotation of the first hinge portion relative to the second hinge portion is supported, while at the same time minimising any gap between the spines and the knuckles to which a ligature could otherwise be secured.

The socket of each spine may be located at an apex of the concave abutment surface. The socket may be recessed from the concave abutment surface, for example recessed from the apex of the concave abutment surface. Accordingly, the sliding joint is concealed in the assembled continuous hinge.

The first hinge portion may further comprise a first plurality of bridging members attached to the first spine, each of the first plurality of bridging members positioned adjacent a respective one of the second plurality of knuckles (for example between the first spine and a respective one of the second plurality of knuckles).

The second hinge portion may further comprise a second plurality of bridging members attached to the second spine, each of the second plurality of bridging members may be positioned adjacent a respective one of the first plurality of knuckles (for example between the second spine and a respective one of the first plurality of knuckles).

Thus, each first bridging member may act to bridge a gap between adjacent knuckles of the first hinge portion. Similarly, each second bridging member may act to bridge a gap between adjacent knuckles of the second hinge portion In some examples, each bridging member may further act to bridge a gap between a respective knuckle and the spine opposing the respective knuckle. Therefore, potential snagging or anchor points are further eliminated. Each bridging member may be a separate piece. As with the knuckles, the modular nature of the bridging members ensures that the continuous hinge can be manufactured without wasting material.

Each of the first plurality of bridging members may comprise a concave surface that sits substantially flush with an outer surface of a respective one of the second plurality of knuckles. In particular, where each knuckle comprises a generally cylindrical barrel, each of the first plurality of bridging members may comprise a concave surface having a radius of curvature that substantially matches that of an outer surface of the generally cylindrical barrel of a respective knuckle. Each of the first plurality of bridging members may further comprise an attachment portion extending from the concave surface, the attachment portion comprising an attachment surface for attachment to its respective spine. The attachment surface may be located along a plane that extends through or adjacent a focus of the concave portion. Alternatively, the attachment surface may be located along a plane that is displaced from a focus of the concave portion.

Attachment between the first spine and each of the first plurality of bridging members may comprise the first sliding joint. In other words, the first sliding joint may attach the first spine to the first plurality of knuckles and to the first plurality of members. Thus, at least one tail may extend along the attachment surface of each of the first plurality of bridging members, the at least one tail corresponding to the at least one socket of the first spine. In an example, a pair of parallel tails extend along the attachment surface of each of the first plurality of bridging members. The tail(s) of each of the first plurality of bridging members may have sloped side-surfaces that each form an acute angle with the attachment surface from which they extend. That is to say, each tail may be narrower at its interface with the attachment surface than it is at a midpoint displaced from its interface with the attachment surface. Where the first sliding joint is a sliding dovetail joint, the tails will have a dovetail shape.

Each of the second plurality of bridging members may comprise a concave surface that sits substantially flush with an outer surface of the respective one of the first plurality of knuckles. In particular, where each knuckle comprises a generally cylindrical barrel, each of the second plurality of bridging members may comprise a concave surface having a radius of curvature that substantially matches that of an outer surface of the generally cylindrical barrel of a respective knuckle. Each of the second plurality of bridging members may further comprise an attachment portion extending from the concave surface, the attachment portion comprising an attachment surface for attachment to its respective spine. The attachment surface may be located on a plane that extends through or adjacent a focus of the concave portion. Alternatively, the attachment surface may be located on a plane that is displaced from a focus of the concave portion.

Attachment between the second spine and each of the second plurality of bridging members may comprise the second sliding joint. In other words, the second sliding joint may attach the second spine to the second plurality of knuckles and to the second plurality of members. Thus, at least one tail may extend along the attachment surface of each of the second plurality of bridging members, the at least one tail corresponding to the at least one socket of the second spine. In an example, a pair of parallel tails extend along the attachment surface of each of the second plurality of bridging members. The tail(s) of each of the second plurality of bridging members may have sloped side-surfaces that each form an acute angle with the attachment surface from which they extend. That is to say, each tail may be narrower at its interface with the attachment surface than it is at a midpoint displaced from its interface with the attachment surface. Where the second sliding joint is a sliding dovetail joint, the tails will have a dovetail shape.

The knuckles and bridging members of the first hinge portion may alternate along a length of the first hinge portion. They may abut one another along the length of the first hinge portion.

Similarly, the knuckles and bridging members of the second hinge portion may alternate along a length of the second hinge portion. They may abut one another along the length of the second hinge portion.

The continuous hinge is modular in that the first spine, the second spine, each of the knuckles, and each of the bridging members, are separate parts. Each of these parts may have a shape enabling it to be fabricated by extrusion. In particular, each part may have a substantially uniform cross-sectional profile. Furthermore, the first spine and the second spine may be substantially identical to each other. Similarly, the knuckles of the first and second pluralities of knuckles may be substantially identical to one another. And the bridging members of the first and second pluralities of bridging members may be substantially identical to one another. Accordingly, the number of extrusion moulds needed to fabricate the continuous hinge is reduced.

Where parts are defined herein as being "substantially identical to each other", we are referring to a level of similarity between the parts that results from the parts being sections of the same extruded part.

In a third aspect there is provided a method of manufacturing a continuous hinge, the method comprising: forming constituent parts of the continuous hinge by extrusion; and assembling the continuous hinge from the constituent parts. The constituent parts comprise knuckles. Optionally, the constituent parts further comprise a first spine and a second spine. The constituent parts may also comprise bridging members.

For example, the third aspect may be a method of manufacturing a continuous hinge according to the first aspect or the second aspect.

Forming the constituent parts may comprise forming a plurality of constituent parts as a single piece by extrusion; and separating the single piece into the plurality of constituent parts. For example, where the constituent parts comprise knuckles, forming the knuckles may comprise extruding a plurality of the knuckles as a single piece by extrusion; and separating the single piece into the plurality of the knuckles. Where the constituent parts also comprise bridging members, forming the bridging members may comprise extruding a plurality of the bridging members as a further single piece by extrusion; and separating the further single piece into the plurality of bridging members.

The assembling may include assembling a first plurality of the knuckles into a first hinge portion, assembling a second plurality of the knuckles into a second hinge portion; and coupling the first hinge portion to the second hinge portion.

Assembling the first hinge portion may comprise alternately threading a first plurality of the knuckles and a first plurality of the bridging portions along a first spine; and assembling the second hinge portion may comprise alternately threading a second plurality of the knuckles and a second plurality of the bridging portions along the second spine. The threading may comprise assembling the sliding joint(s).

Alternatively, assembling the first hinge portion may comprise threading a first plurality of the knuckles along the first spine, arranging the first plurality of knuckles along the first spine so that they are equally spaced from one another, and optionally securing each of the first plurality of knuckles in place by passing a screw through the first spine and into the knuckle. Similarly, assembling the second hinge portion may comprise threading a second plurality of the knuckles along the second spine, arranging the second plurality of knuckles along the second spine so that they are equally spaced from one another, and optionally securing each of the second plurality of knuckles in place by passing a screw through the second spine and into the knuckle.

Assembling the hinge portions may further comprise affixing a bushing to each axial end of each knuckle. This may be done before threading the knuckles along the spines, or after threading the knuckles along the spines.

Coupling the first hinge portion to the second hinge portion may comprise passing a pin through the knuckles. For example, it may comprise interdigitating the first plurality of knuckles with the second plurality of knuckles (such that the bores of the first and second plurality of knuckles align), and then passing the pin through the interdigitated knuckles.

Forming the constituent parts may comprise extruding a plurality of the knuckles as a single piece, and dividing the single piece into individual knuckles. The forming may further comprise extruding a plurality of the bridging members as a single piece, and dividing the single piece into individual bridging members.

The extrusion may be aluminium extrusion.

BRIEF DESCRIPTION OF THE FIGURES

Examples of the present disclosure will now be described, by way of example only, with reference to the accompanying figures, in which.

Like reference numerals are used for like features throughout the description.

DETAILED DESCRIPTION

Figure 1:
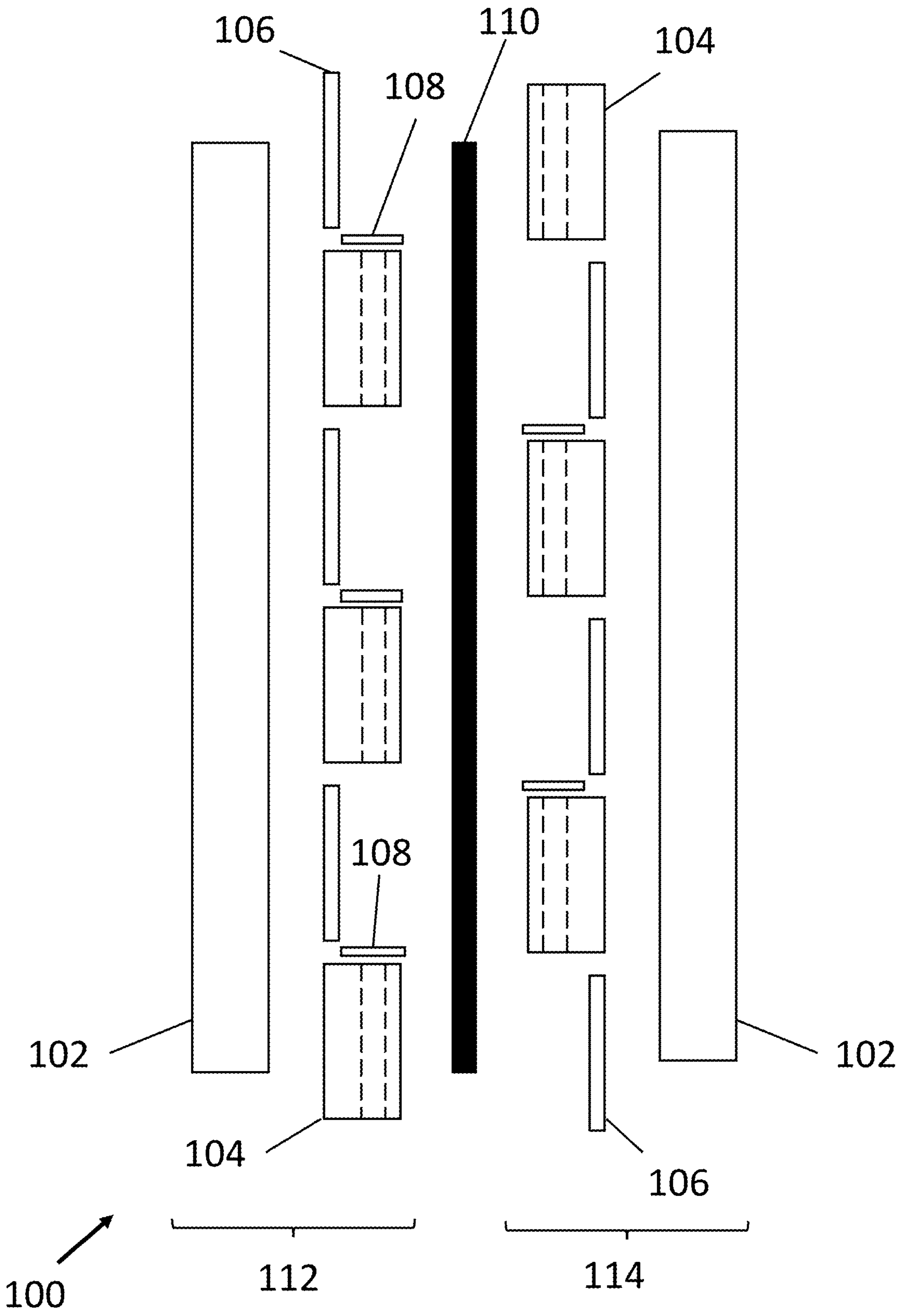
FIG. 1 shows an exploded schematic view of a continuous hinge according to a first embodiment.

FIG. 1 shows an exploded, or unassembled, view of a continuous hinge 100 according to a first embodiment. As shown, the constituent parts of the continuous hinge are: spines 102; knuckles 104; bridging members 106; bushings 108; and pin 110. Each of these parts, except for the pin, is an extruded aluminium piece. Pin 110 is a cylindrical steel piece.

Figure 2:
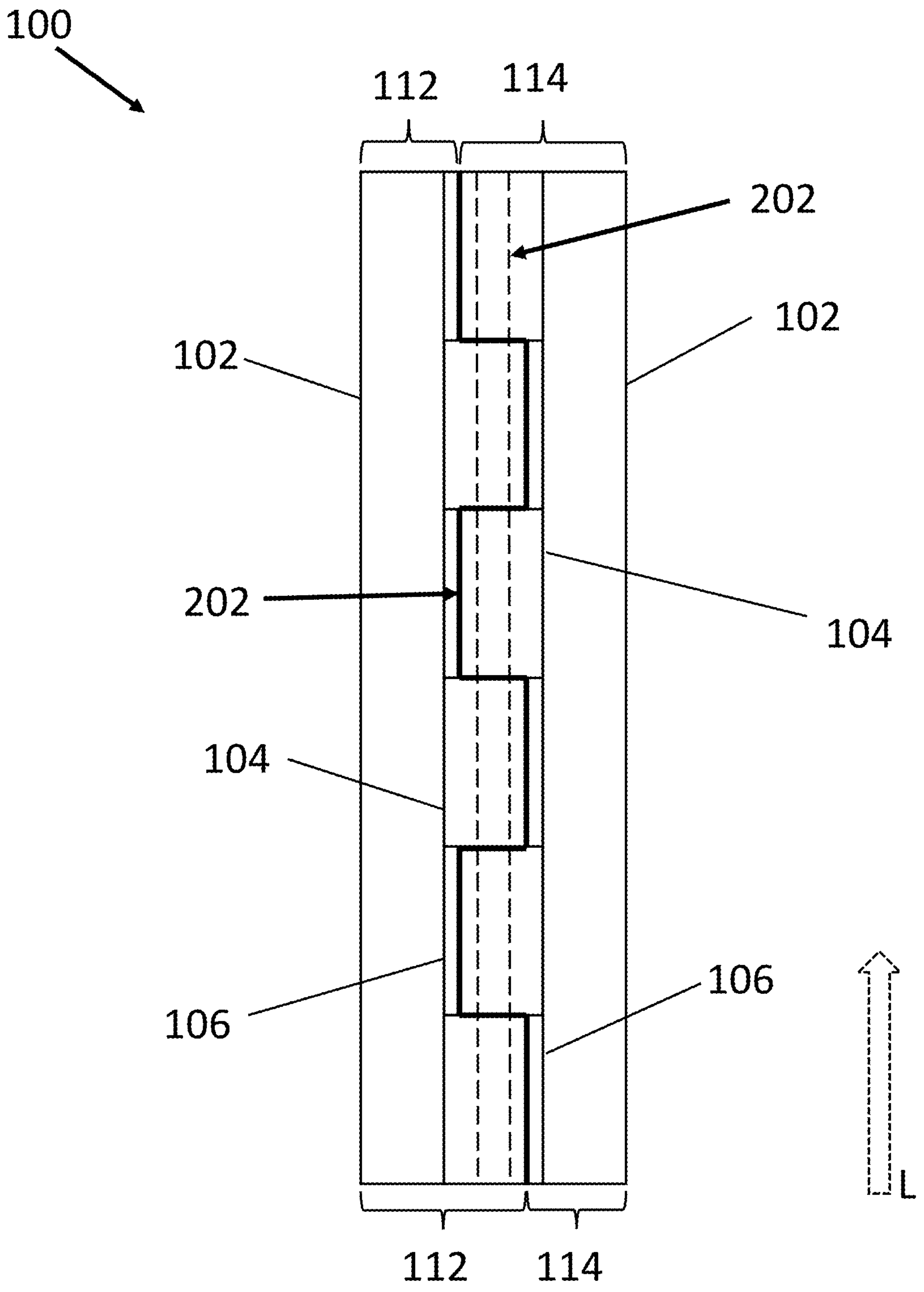
FIG. 2 shows an assembled schematic view of the continuous hinge of FIG. 1.

The parts to the left of the pin 110 in FIG. 1 collectively form a first hinge portion 112. And the parts on the right of the pin 110 in FIG. 1 collectively form a second hinge portion 114, which opposes the first hinge portion and is pivotally connected to the first hinge portion when the continuous hinge is assembled as shown in FIG. 2.

With continued reference to FIG. 1, the first hinge portion 112 of the specific example shown has three knuckles 104, and three bridging members 106. The knuckles of the first hinge portion 112 are collectively known herein as a first plurality of knuckles. And the bridging members 106 of the first hinge portion 112 are collectively known herein as a first plurality of bridging members. Similarly, the second hinge portion 114 of the specific example shown has three knuckles 104, and three bridging members 106. The knuckles of the second hinge portion 114 are collectively known as a second plurality of knuckles. And the bridging members 106 of the second hinge portion 114 are collectively known as a second plurality of bridging members. The present disclosure is not to be seen as limited to the specific number of components as shown in FIG. 1. There may be any number of knuckles, bushings and bridging members. The number of components will depend on the total length of the continuous hinge, among other factors. However, the number of bridging members 106 of the first hinge portion 112 will be equal to the number of knuckles 104 of the second hinge portion 114. And the number of bridging members 106 of the second hinge portion 114 will be equal to the number of knuckles 104 of the first hinge portion 112. Accordingly, each knuckle 104 will abut an opposing bridging member when assembled, and vice versa.

Generally, the number of knuckles 104 of the first hinge portion will be equal to the number of knuckles 104 of the second hinge portion 114, as shown. However, the number of knuckles 104 of the first hinge portion 112 may be one more than, or one fewer than, the number of knuckles 104 of the second hinge portion 114. The same applies to the bridging members 106 of the first and second hinge portions.

A bushing 108 is provided between each adjacent pair of knuckles, to enable each adjacent pair of knuckles to rotate relative to one another. In the depicted example, there are five bushings. But as the skilled person will appreciate, the number of bushings will be N−1 (where N is the total number of knuckles in the continuous hinge, and N is also the number of bridging members in the continuous hinge).

Spine 102 of the first hinge portion 112 is identical to spine 102 of the second hinge portion 114. Similarly, the knuckles 104 of the first hinge portion 112 are identical to the knuckles 104 of the second hinge portion 114; and bridge members 106 of the first hinge portion 112 are identical to knuckles 106 of the second hinge portion 114.

As is illustrated with broken lines in FIG. 1, each knuckle has a channel extending therethrough. The inner diameter of this channel is slightly larger than the outer diameter of the pin 110. Thereby, the pin can extend through the channels in the knuckles when assembled, and rotation of the first hinge portion relative to the second hinge portion is possible.

As can also be seen in FIG. 1, the knuckles 104 and bridging members 106 of the first hinge portion 112 alternate along the length of the first hinge portion 112. Similarly, the knuckles 104 and bridge portions 106 of the second hinge portion 114 alternate along the length of the second hinge portion 114.

FIG. 2 shows an assembled view of the continuous hinge 100 of FIG. 1. As shown, the continuous hinge is elongate, having a longitudinal axis L in the axial direction. When attached to a door leaf, the longitudinal axis is parallel to the edge of the door leaf to which the continuous hinge 100 is attached.

As depicted, in this view the components are assembled to form a continuous hinge 100 that comprises a first elongate hinge portion 112 and a second elongate hinge portion 114. When assembled, the first hinge portion 112 abuts the second hinge portion 114. In particular, the first plurality of knuckles are interdigitated with the second plurality of knuckles. That is to say, the first plurality of knuckles interlock with the second plurality of knuckles like the fingers of two clasped hands. When assembled in this way, the respective channels of the individual knuckles co-align to form a single elongate channel 200 that extends the full length of the hinge. The pin extends through this single channel 200, thereby securing the first hinge portion and the second hinge portion together. Moreover, because the single channel 200 and the pin are cylindrical, the first hinge portion and the second hinge portion are able to rotate relative to one another about an axis defined by the pin 110 and the single channel 200. The bushings 108 (not shown in FIG. 2) help to enable smooth rotation about this axis.

As is also depicted in FIG. 2, each bridging member 106 of the first hinge portion 112 bridges a gap between the spine 102 of the first hinge portion 112 and a respective knuckle 104 of the second hinge portion 114. Similarly, each bridging member 106 of the second hinge portion 114 bridges a gap between the spine 102 of the second hinge portion 114 and a respective knuckle 104 of the first hinge portion 112.

When assembled, the interface between the opposing first and second hinge portions 112, 114 may create a zig-zag pattern 202 that extends from one end of the continuous hinge 100 to the other. No gaps exist between the first hinge portion 112 and the second hinge portion 114. Therefore, there are no anchor points or snag points present between the first and second hinge portions.

Figure 3:
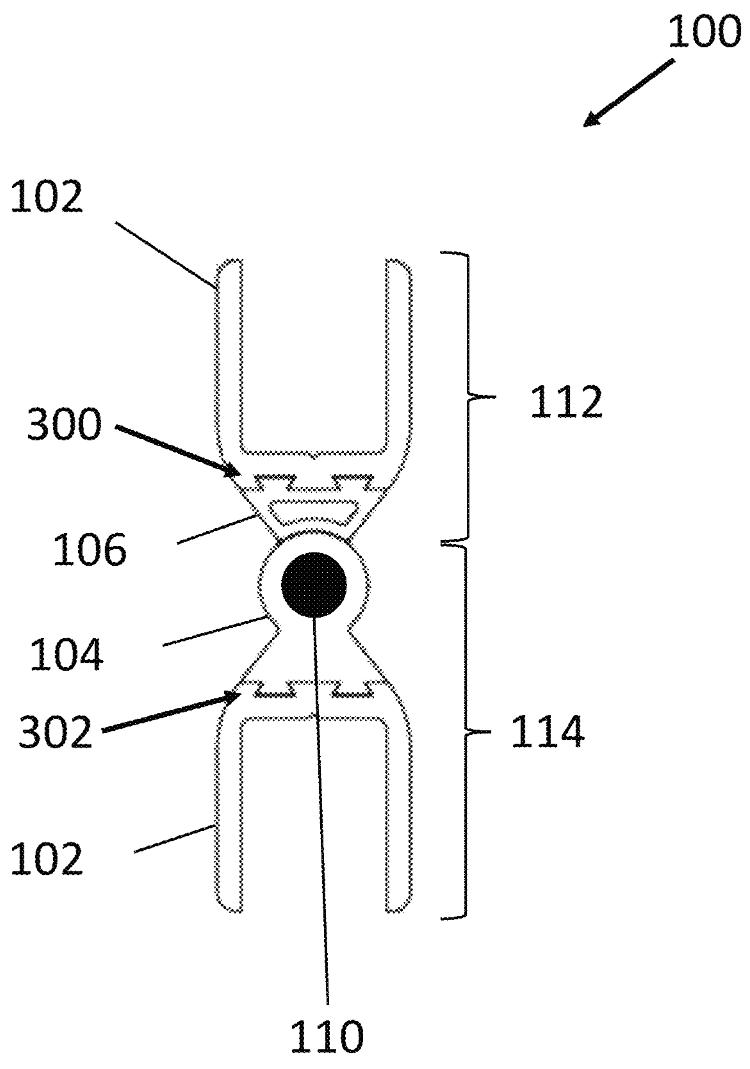
FIG. 3 is an end-view of the assembled continuous hinge of FIG. 2.

The continuous hinge 100 of the first embodiment is a double-action continuous hinge in that, when attached to a door, it supports opening of the door both in the 'inward' direction, and the 'outward' direction. FIG. 3 shows an end-view of the continuous hinge 100 of the first embodiment, as viewed from above in FIG. 2. It is the symmetrical shape of the continuous hinge 100 that enables it to open in both directions.

FIG. 3 shows how the spine 102, knuckles 104 and bridging members 106 of the first hinge portion 112 are attached together; and how the spine 102, knuckles 104 and bridging members 106 of the second hinge portion 114 are attached together.

It is to be understood that each knuckle 104 in FIG. 2 is identical. Therefore, features described herein for the top-most knuckle 104 in FIG. 3 apply equally to the other knuckles 104 shown in FIG. 2. Similarly, features described herein for the top-most bridging member 106 in FIG. 3 apply equally to the other bridging members 106 shown in FIG. 2.

Depicted in FIG. 3 is the top-most bridging member 106 of the first hinge portion 112 as shown in FIG. 2; and the top-most knuckle 104 of the second hinge portion 114 as shown in FIG. 2. The top-most bridging portion 106 abuts the top-most knuckle 104. Cylindrical pin 110 extends through top-most knuckle 104 of the second hinge portion 114.

A first sliding joint 300 connects the elongate spine 102 of the first hinge portion 112 to the top-most bridging member 106; and a second sliding joint 302 connects the elongate spine 102 of the second hinge portion 114 to the top-most knuckle 104. The sliding joint has tails and sockets that extend along the longitudinal axis of the continuous hinge. Therefore, the continuous hinge is assembled by sliding the knuckles and the bridging members along the spine. Further, because the tails and sockets are oriented in parallel with the longitudinal axis of the continuous hinge and extend in the same direction as the barrels of the knuckles, the components of the continuous hinge each have a shape that can be formed through extrusion.

As depicted, the first sliding joint 300 comprises a pair of parallel sockets that extend along the spine 102 of the first hinge portion 112 in the axial direction (perpendicular to the page in FIG. 3); and a corresponding pair of parallel tails that extend along an attachment surface at an edge of the top-most bridging member 106 (perpendicular to the page in FIG. 3). The attachment surface is part of an attachment portion that extends from the concave portion. The tails slot into the sockets.

Similarly, second sliding joint 302 comprises a pair of parallel sockets that extend along the spine 102 of the second hinge portion 114 in the axial direction (perpendicular to the page in FIG. 3); and a corresponding pair of parallel tails that extend along an attachment surface at an edge of the top-most knuckle 104 (perpendicular to the page in FIG. 3). The attachment surface is part of an attachment portion that extends from the generally cylindrical barrel. Again, the tails slot into the sockets.

Each tail may be of a dovetail shape, having side surfaces which each form an acute angle with the attachment surface from which they extend. In particular, each tail may form an angle of 30 degrees with the attachment surface from which they extend. That is, an internal angle A that adjacent side surfaces make with one another may be 60 degrees (see FIG. 4 for illustration). It is this feature that prevents separation of the constituent parts of each hinge portion. As the reader will understand, the tails and sockets are not limited to the dovetail shape illustrated in FIGS. 3-5. In particular, the tails could be rounded rather than having a dovetail shape. This is illustrated in FIG. 10 and FIGS. 11A-11C, in which the tail is narrower at its interface with the attachment surface than it is at a midpoint displaced from its interface with the attachment surface. Again, the tail in FIG. 10 has side surfaces that form an acute angle with the attachment surface from which the tail extends.

With continued reference to FIG. 3, each knuckle 104 includes the same shape and size of tail(s); and each bridging member 106 has the same shape and size of tail(s). Furthermore, each of the spines 102 has the same shape and size of sockets. Therefore, the first sliding joint 300 attaches all of the knuckles 104 and bridging members 106 of the first hinge portion 112 to the first spine 102. Similarly, the second sliding joint 300 attaches all of the knuckles 104 and bridging members 106 of the second hinge portion 112 to the second spine 102. Accordingly the hinge portions 112 and 114 are very robust. The sliding joints prevent them from separating into their constituent parts during use.

Other features shown in FIG. 3 include the cylindrical barrel of the knuckle 104, and the corresponding concave surface of the bridging member 106. The radius of curvature of the outer surface of the cylindrical barrel matches the radius of curvature of the concave surface. Therefore, the bridging member 106 can maintain contact with the knuckle 104 as the hinge rotates about the pin 110. Accordingly, no gaps exist between the first hinge portion 112 and the second portion 114, even as the two hinge portions are rotated relative to one another.

Figure 5:
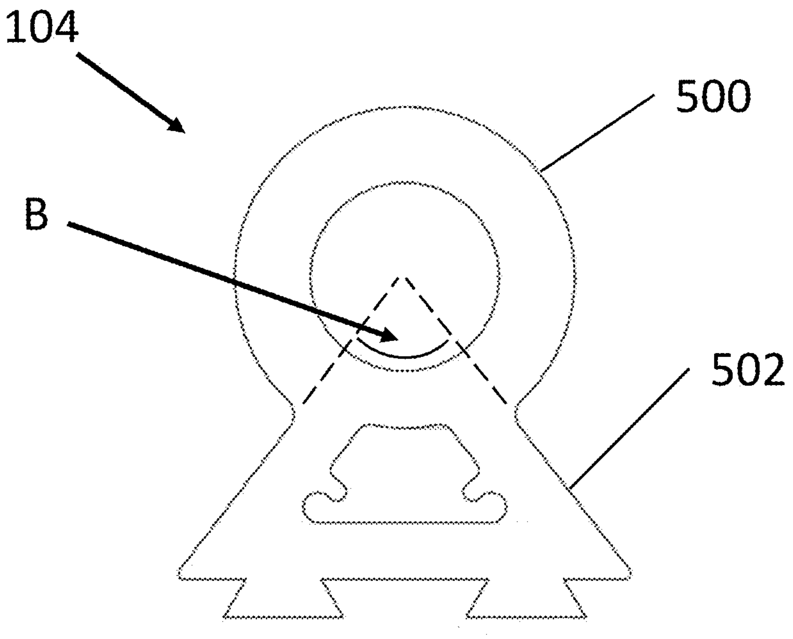
FIG. 5 is an end-view of a knuckle from the continuous hinge of FIG. 1.

Referring to FIG. 5, a base portion 502 of each knuckle 104, which extends from the cylindrical barrel 500 of each knuckle 104, includes the second sliding pattern. Further, the base portion 502 includes planar sidewall surfaces that form an acute internal angle B with each other. Each bridging member 106 similarly includes planar sidewall surfaces that form an acute internal angle with each other. Accordingly, the continuous hinge 100 allows opening of a door in both pivotal directions (i.e. in the 'inwards' and 'outwards' direction).

Figure 4:
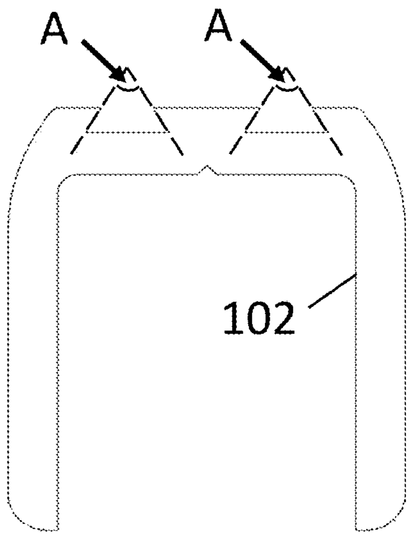
FIG. 4 is an end-view of a spine from the continuous hinge of FIG. 1.

As shown in FIGS. 3 and 4, each spine is generally C-shaped. That is to say, each of them includes two parallel longitudinal walls that extend along the spine. In use, the parallel walls of each spine may receive a door leaf or the like therebetween. The walls of each spine may have an inner spacing of ¾ inch (19.05 mm). Thus, they may be for use with door leaves having a thickness of ¾ inch.

Typically, the continuous hinge disclosed herein will have a length in the axial direction (shown with arrow L in FIG. 2) that is equal to the height of a door leaf to which it is to be attached. For example, the continuous hinge can have a length of 2 m, such that it is suitable for attachment to a door leaf having a height of 2 m.

Alternatively, the spine may be generally L-shaped (not shown), e.g. for attachment to an inner edge or an outer edge of a door frame. Any number of spine shapes could be used, provided that the spine includes the required tails or sockets for attachment to the knuckles and bridging portions.

Figure 6:
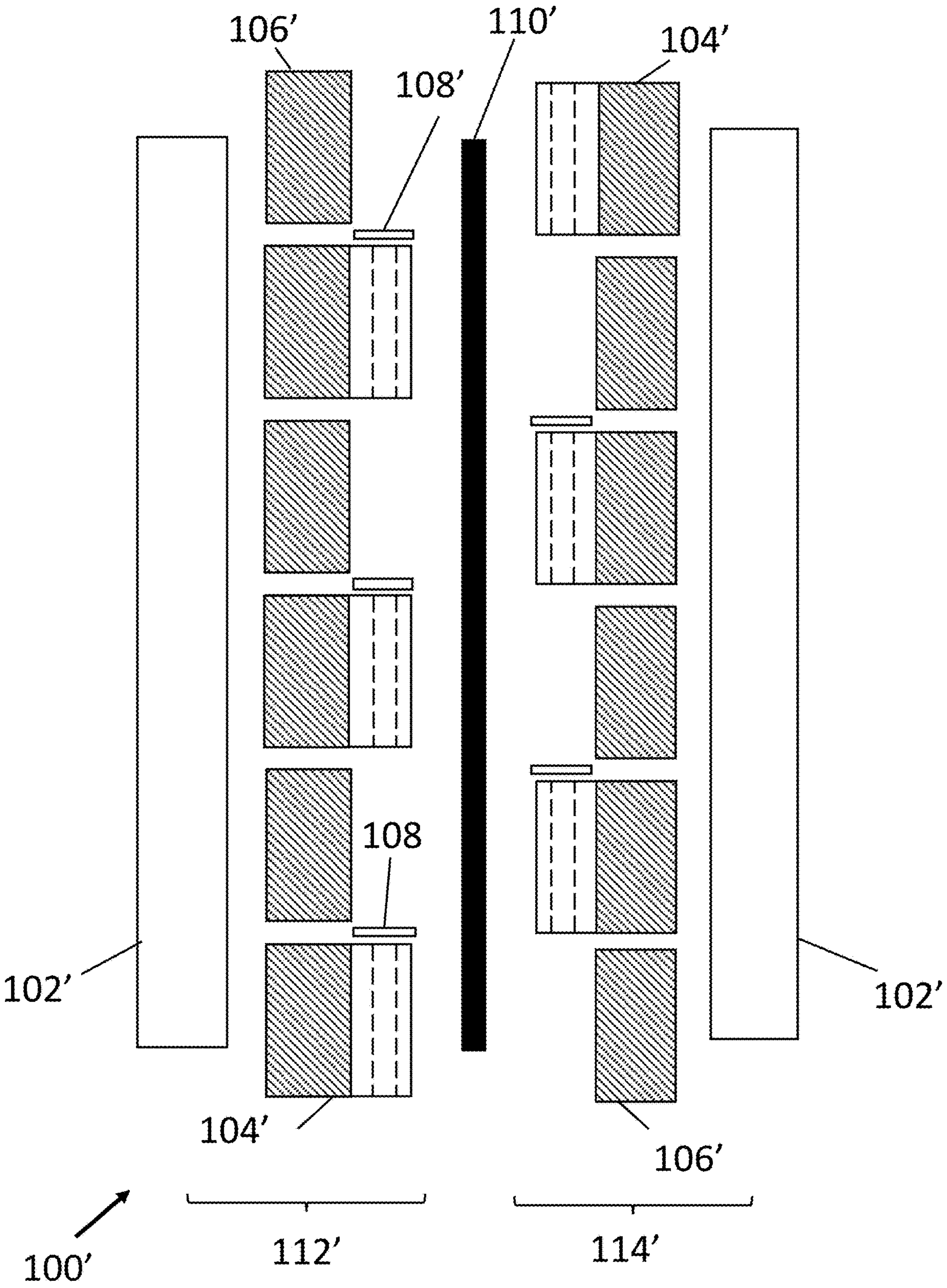
FIG. 6 shows an exploded schematic view of a continuous hinge according to a second embodiment.
Figures 7A, 7B, 7C:
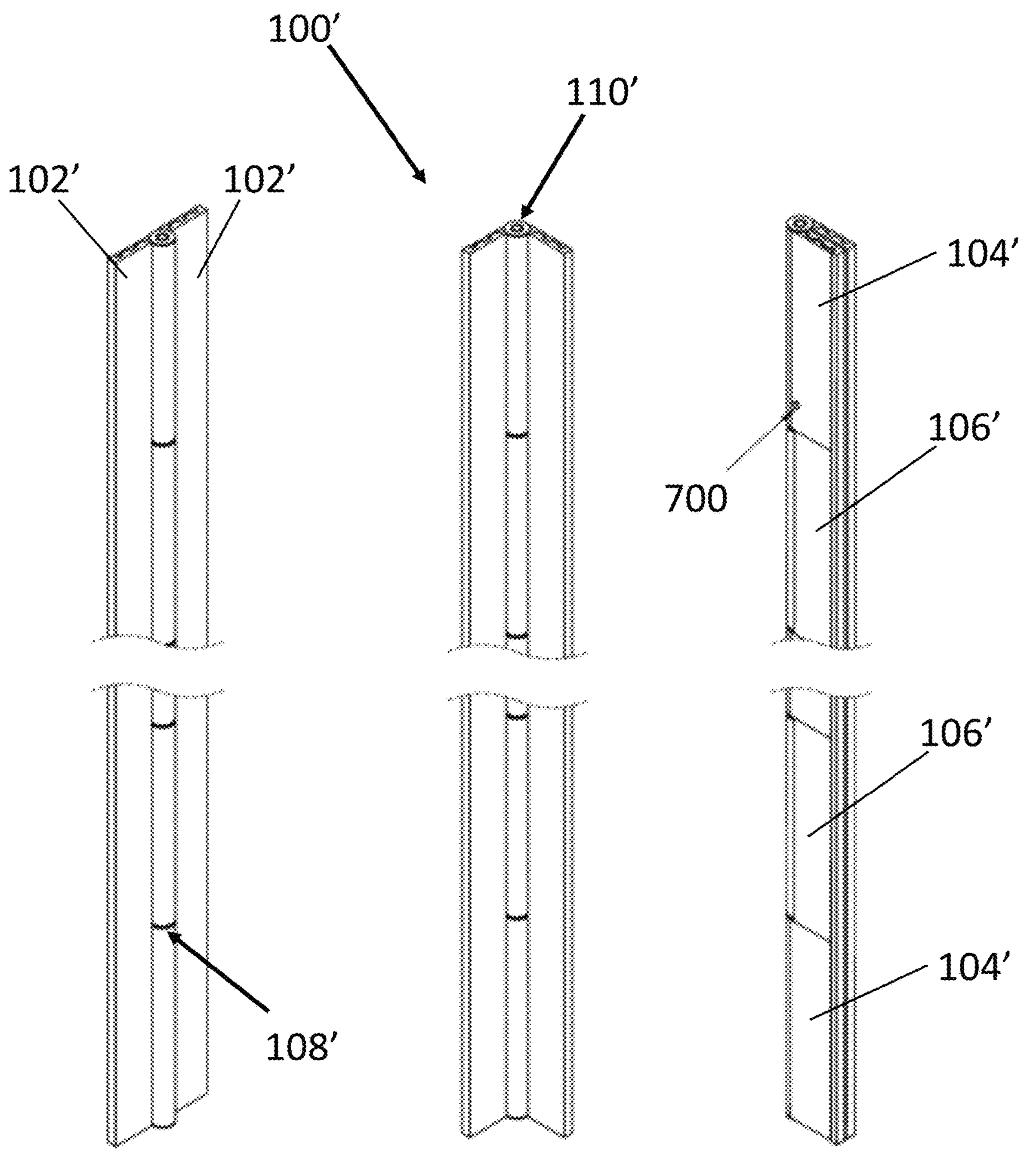
FIGS. 7A, 7B, and 7C show assembled perspective views of the continuous hinge of FIG. 6.
Figure 8:
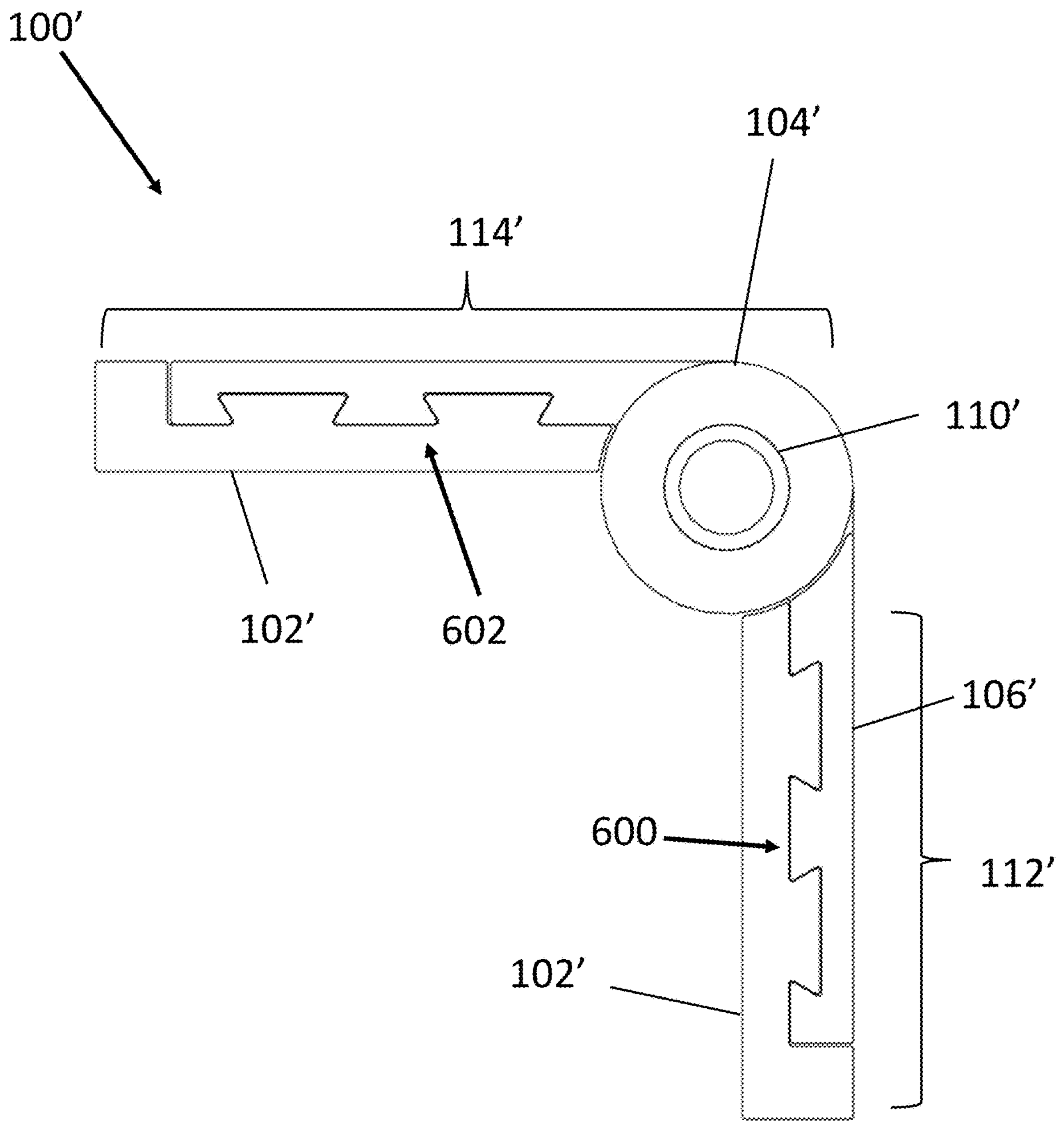
FIG. 8 is an end-view of the assembled continuous hinge as shown in FIG. 7B.

FIGS. 6-8 show a single-action continuous hinge 100' according to a second embodiment, so-called because when fitted to a door, it supports opening of the door in only one direction (the 'inwards' direction, or the 'outwards' direction).

FIG. 6 shows an exploded, or unassembled, view of the continuous hinge 100' according to the second embodiment. As shown, the constituent parts of the continuous hinge 100' are: spines 102'; knuckles 104'; bridging members 106'; bushings 108'; and pin 110'. The constituent parts are split into a first hinge portion 112', and a second hinge portion 114'. As the reader will understand, the continuous hinge 100' of the second embodiment is conceptually similar to the continuous hinge 100 of the first embodiment, but with a number of structural differences as are discussed below.

Cross-hatched regions in FIG. 6 show the location of tails or sockets on the knuckles 104' and the bridging members 106', for engaging (when assembled) corresponding sockets or tails which extend along the reverse-side of each of the spines 102' as shown in FIG. 6. Thus, when assembled, the spine 102' of the first hinge portion 112' attaches to the knuckles 104' and the bridging members 106' of the first hinge portion 112' so as to form a planar attachment surface (for attachment to a door leaf or to a door frame). The same is true of the spine 102', knuckles 104' and bridging members 106' of the second hinge portion 114'.

FIGS. 7A-7C respectively show the single-action continuous hinge 100' in an open position, an ajar (partially open) position, and a closed position. When in the closed position, the spine 102' of the first hinge portion 112' abuts the spine 102' of the second hinge portion. In other words, the continuous hinge 100' can fully close. A wireway 700 for electrical wiring are shown in FIG. 7C. The wireway may, for example, convey wires for operating an electrical door lock system.

As can be seen from FIGS. 7A-7C, the continuous hinge 100' of the second embodiment dispenses with the C-shaped portion from the continuous hinge 100 of the first embodiment. Instead, the continuous hinge 100' of the second embodiment includes planar attachment surfaces for attachment to one of a door leaf and a door frame.

FIG. 8 is an end-view of the continuous hinge 100' of the second embodiment, as viewed from above in FIG. 7B.

As shown in FIG. 8, the spines 102' of the single-action continuous hinge 100' are each a flat plate carrying sliding sockets/tails. Each of the spines 102' is for attachment to one of a door leaf and a door frame.

FIG. 8 shows how the spine 102', knuckles 104' and bridging members 106' of the first hinge portion 112' are attached together; and how the spine 102', knuckles 104' and bridging members 106' of the second hinge portion 114' are attached together.

It is to be understood that each knuckle 104' in FIGS. 6 and 7 is identical. Therefore, features described herein for the top-most knuckle 104' in FIG. 8 apply equally to the other knuckles 104' shown in FIGS. 6 and 7. Similarly, features described herein for the top-most bridging member 106' in FIG. 8 apply equally to the other bridging members 106' shown in FIGS. 6 and 7.

Depicted in FIG. 8 is the top-most bridging member 106' of the first hinge portion 112' as shown in FIGS. 6 and 7; and the top-most knuckle 104' of the second hinge portion 114' as shown in FIGS. 6 and 7. The top-most bridging portion 106' abuts the top-most knuckle 104'. Cylindrical pin 110' extends through top-most knuckle 104' of the second hinge portion 114'.

A first sliding joint 600 connects the elongate spine 102' of the first hinge portion 112' to the top-most bridging member 106'; and a second sliding joint 602 connects the elongate spine 102' of the second hinge portion 114' to the top-most knuckle 104'.

As depicted, the first sliding joint 600 comprises a pair of parallel sockets that extend along the spine 102' of the first hinge portion 112' in the axial direction (perpendicular to the page in FIG. 8); and a corresponding pair of parallel tails that extend along an attachment surface at an edge of the top-most bridging member 106' (perpendicular to the page in FIG. 8). The attachment surface is part of an attachment portion that extends from the concave portion. The tails slot into the sockets.

Similarly, second sliding joint 602 comprises a pair of parallel sockets that extend along the spine 102' of the second hinge portion 114' in the axial direction (perpendicular to the page in FIG. 8); and a corresponding pair of parallel tails that extend along an attachment surface at an edge of the top-most knuckle 104' (perpendicular to the page in FIG. 8). The attachment surface is part of an attachment portion that extends from the generally cylindrical barrel. Again, the tails slot into the sockets.

Figure 10:
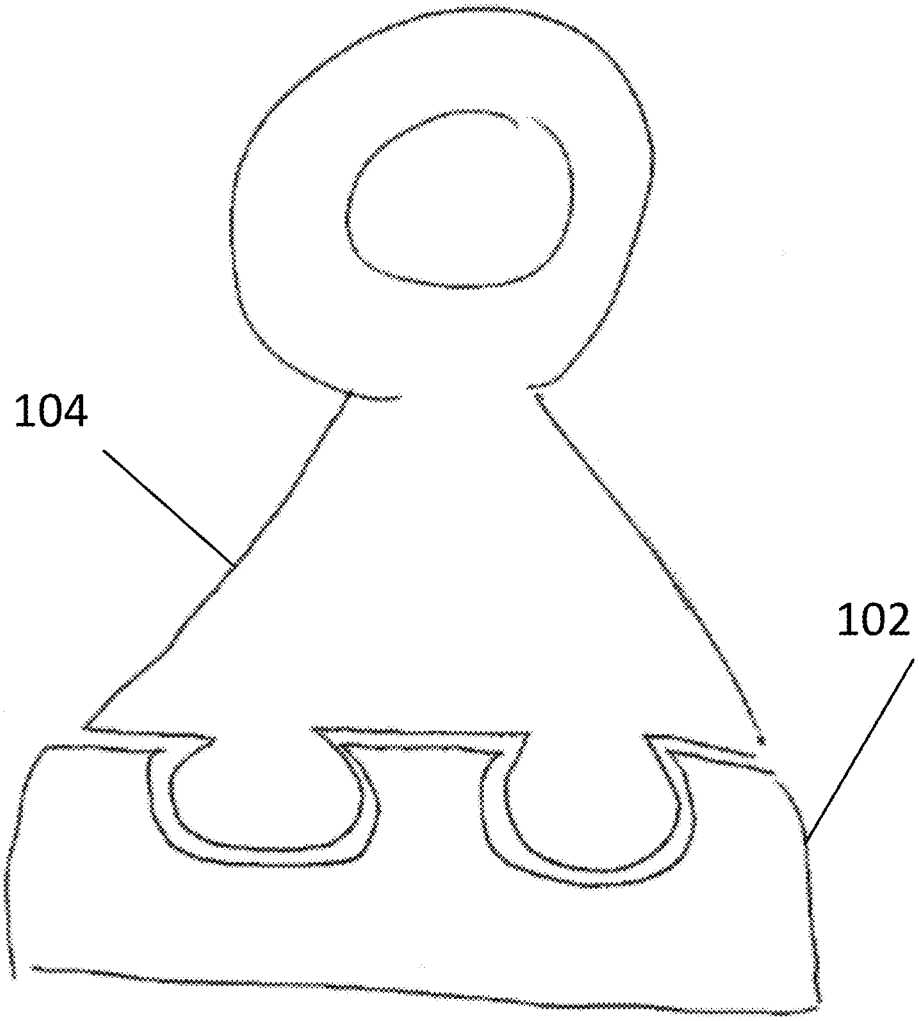
FIG. 10 illustrates an alternative to a sliding dovetail joint, for use in examples of the present disclosure.

Each tail may be of a dovetail shape, having side surfaces which each form an acute angle with the attachment surface from which they extend. In particular, each tail may form an angle of 30 degrees with the attachment surface from which they extend. That is, an internal angle A that adjacent protrusions make with one another may be 60 degrees. It is this feature that prevents separation of the constituent parts of each hinge portion. Again, the tails and sockets could alternatively be shaped as shown in FIG. 10, for example.

Each knuckle 104' includes the same shape and size of tails; and each bridging member 106' has the same shape and size of tail. Furthermore, each of the spines 102' has the same shape and size of sockets. Therefore, the first sliding joint 600 attaches all of the knuckles 104' and bridging members 106' of the first hinge portion 112' to the first spine 102'. Similarly, the second sliding joint 300 attaches all of the knuckles 104' and bridging members 106' of the second hinge portion 112' to the second spine 102'. Accordingly the hinge portions 112' and 114' are very robust. The sliding joints prevent them from separating into their constituent parts during use.

Other features shown in FIG. 8 include the cylindrical barrel of the knuckle 104', and the corresponding concave surface of the bridging member 106'. The radius of curvature of the outer surface of the cylindrical barrel matches the radius of curvature of the concave surface. Therefore, the bridging member 106' can maintain contact with the knuckle 104' as the hinge rotates about the pin 110'. Accordingly, no gaps exist between the first hinge portion 112' and the second portion 114', even as the two hinge portions are rotated relative to one another.

Figure 11A:
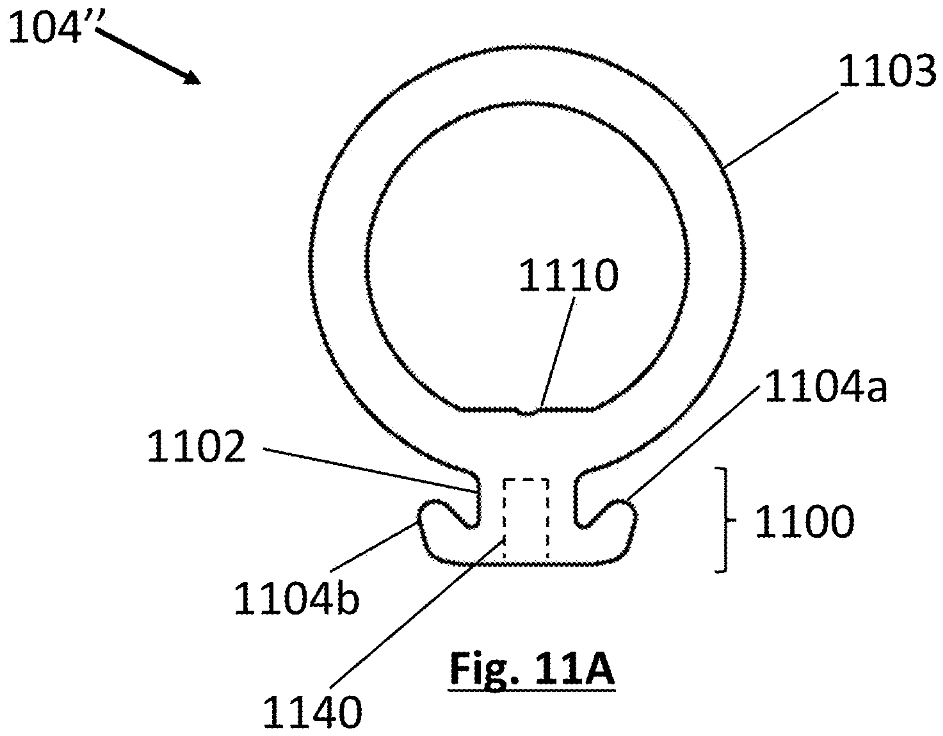
FIGS. 11A and 11B respectively illustrate an end-view and a perspective-view of a knuckle belonging to a further alternative to a sliding dovetail joint.
Figure 11B:
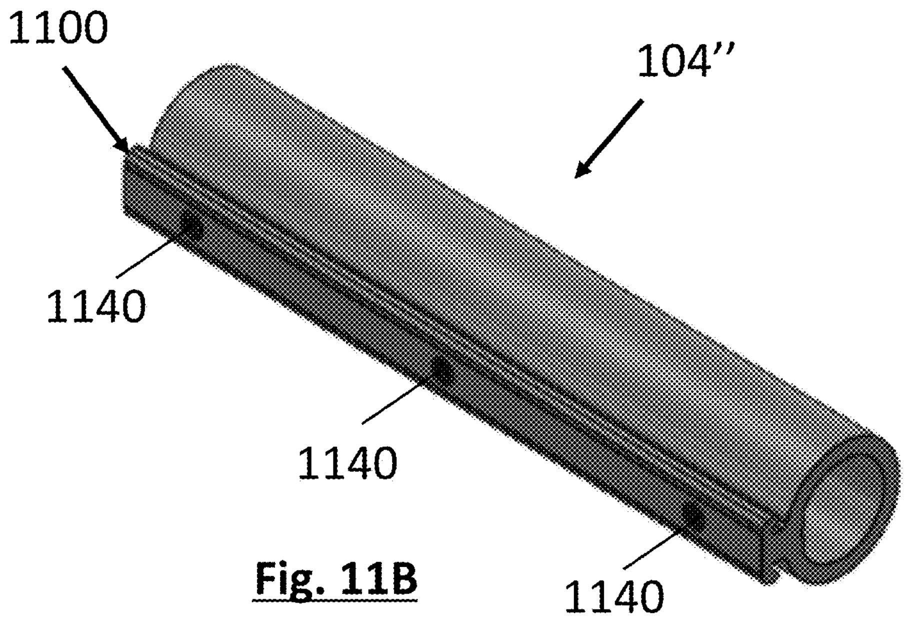
Figure 12:
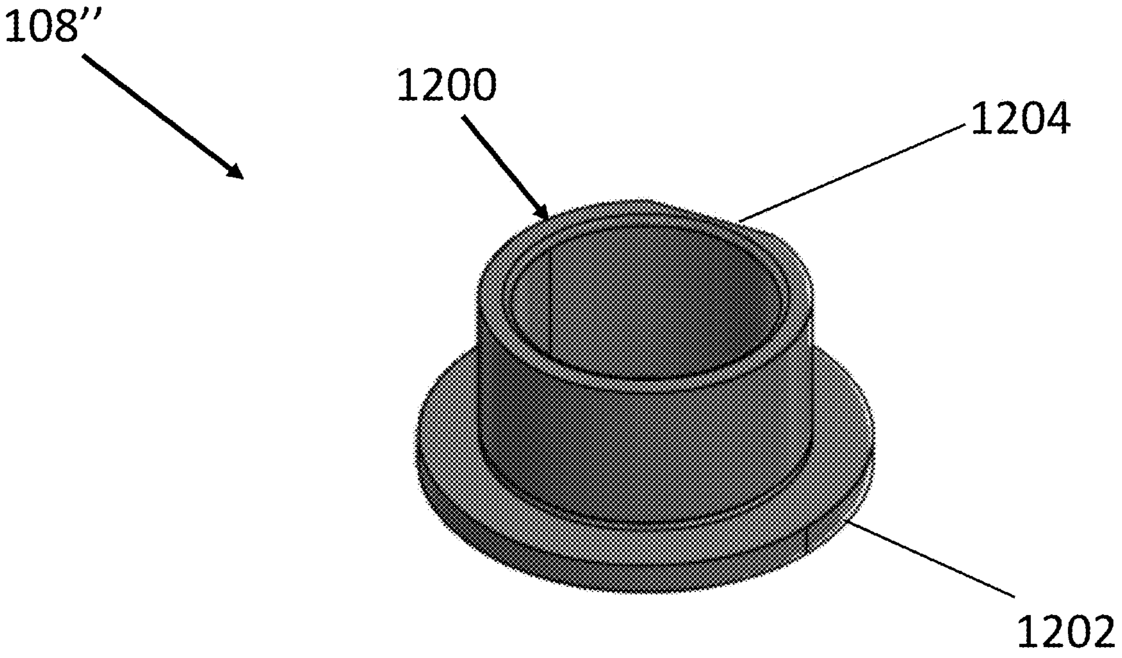
FIG. 12 illustrates a bushing for attachment to the knuckle of FIGS. 11A-11B.
Figure 13:
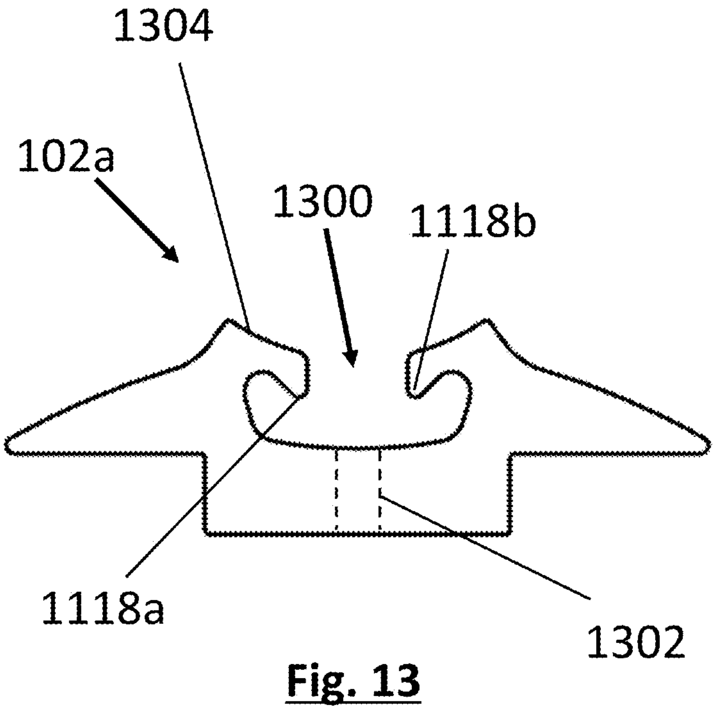
FIG. 13 illustrates a first spine for attachment to a knuckle according to FIGS. 11A-11B.
Figure 14:
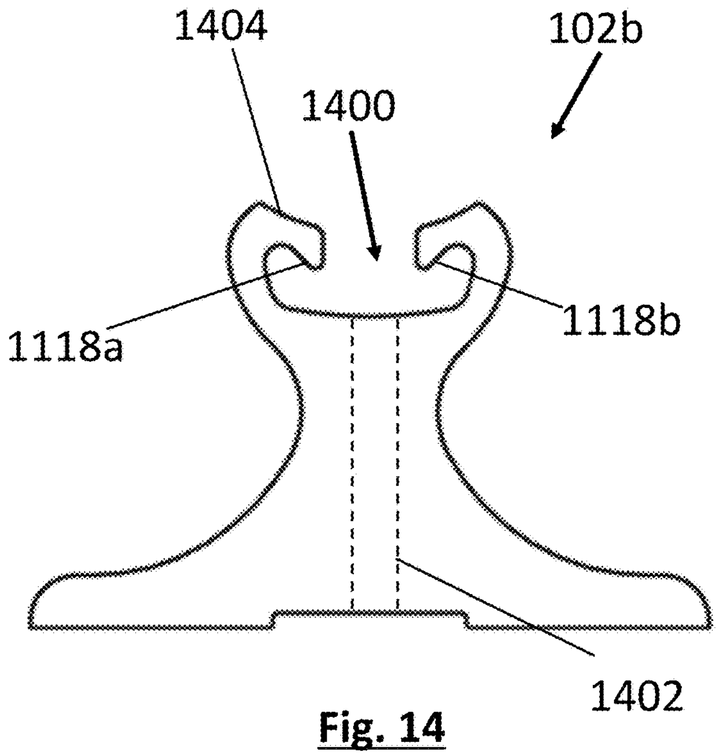
FIG. 14 illustrates a second spine for attachment to a knuckle according to FIGS. 11A-11B.

FIGS. 11-15 show another alternative sliding joint configuration, for use as an alternative to the dovetail configuration shown above. FIGS. 11A-11B show a knuckle 104" forming part of the alternative sliding joint configuration; FIG. 12 shows a bushing 108" for attachment to the knuckle 104"; FIG. 13 shows a first spine **102*a* forming part of the alternative sliding joint configuration; FIG. 14 shows a second spine 102*b* forming part of the alternative sliding joint configuration; and FIGS. 15A-15B show a continuous hinge 100" incorporating the components from FIGS. 11-14**.

As shown in FIGS. 11A-11B, knuckle 104" comprises a tail 1100. The tail 1100 comprises a stem 1102 which extends radially from a cylindrical outer surface 1103 of the knuckle, and a pair of opposing fingers **1104*a*, 1104*b* which each extend from a distal end of the stem 1102 (distal from the barrel), and curve back towards the knuckle 104", such that each finger 1104*a*, 1104*b* forms an acute angle with the stem 1102 from which it extends. In the depicted example, each of the fingers 1104*a*, 1104*b* forms an acute angle of approximately 45 degrees with the stem 1102. As will be described below, each of the first spine 102*a* and the second spine 102*b* comprises an axial socket 1300, 1400 having a shape corresponding to that of the tail 1100, so that the knuckle 104" can be securely attached to either one of the spines 102*a*, 102*b* by sliding the tail 1100 along one of the socket 1300 and the socket 1400** in the axial direction.

With continued reference to FIGS. 11A-11B, the bore of the knuckle 104" comprises a flat portion 1110. The flat portion 1110 is positioned adjacent the stem 1102. Flat portion 1100 is provided to engage a corresponding flat portion 1204 of the bushing 108" (described below) when assembled, to thereby prevent rotation of the bushing 108" relative to the knuckle 104".

Referring now to FIG. 12, the bushing 108" includes a tubular portion 1200 and a flange portion 1202. The tubular portion 1200 is shaped for a snug fit within the bore of the knuckle 104", such that rotation of the bushing 108" relative to the knuckle 104" is prevented. In particular, bushing 108" includes a flat portion 1204 corresponding to the flat portion 1110 of the knuckle 104". When assembled, such that the tubular portion 1200 of the bushing 108" is inserted into the bore of the knuckle 104", the flat portion 1204 of the bushing 108" will engage the flat portion 1110 of the knuckle 104" to thereby prevent rotation of the bushing 108" within the knuckle 104".

Unlike the outer surface of the tubular portion 1200, the inner surface of the tubular portion 1200 has a circular cross-section, with no flat portions. Accordingly, when the pin 110 is passed through the bushing 108", the bushing 108" will be rotatable relative to the pin 110.

In some examples, one bushing 108" may be inserted into each axial end of each knuckle 104". Accordingly, smooth rotation of the pin 110 within the knuckles 104" is supported. Smooth operation of the continuous hinge 100" is thereby ensured.

The outer diameter of the flange portion 1202 may be substantially equal to the diameter of the outer surface 1103 of the knuckle 104", such that the outer surface of the flange portion 1202 sits substantially flush with the outer surface 1103 of the knuckle 104" when assembled. Rotation of the interdigitated knuckles relative to one another is thereby aided.

We turn now to FIGS. 13-14. Each of the first spine **102*a* and the second spine 102*b* comprises a respective socket 1300, 1400 having a shape corresponding to that of the tail 1100. That is, each of the sockets 1300, 1400 is configured to receive the tail 1100 of a respective knuckle 104" (or indeed of a respective plurality of knuckles 108"). As depicted in FIGS. 13 and 14, the parallel walls forming the receiving portion from earlier examples are dispensed with. As the reader will understand, the parallel walls are optional in this example (and every example), and may be included as required. Typically, the first spine 102***a* is for attachment to a door leaf; while second spine 102*b* is for attachment to a door frame.

The sockets 1300, 1400 have a shape that generally corresponds to that of the tail 1100. That is to say, the tail 1100 comprises the male part of the sliding joint, and the sockets 1300, 1400 comprise the female part of the sliding joint.

Sockets 1300, 1400 each also comprise fingers 1118*a*, 1118*b* which are configured to extend between the fingers 1104*a*, 1104*b* and the stem 1102 when assembled. The fingers 1118*a*, 1118*b* curve inwards to securely engage the fingers 1104*a*, 1104*b*. The joint is robust as a result.

Once a knuckle 104" has been threaded along one of the first spine 102*a* or the second spine 102*b* using the sliding joint, it can then be secured in place, so as to stop it from sliding relative to the spine. This is achieved by passing a screw, pin or rivet (not shown) through the spine and into the knuckle. The screw, pin or rivet extends through a channel 1302, 1402 in the spine, and into channel 1140 of the knuckle. Because the screw, pin or rivet extends in the transverse direction (i.e. perpendicular to the axis of the sliding joint), it acts to prevent sliding of the knuckle 108" relative to the spine. Where a threaded screw is used, the channels 1140, 1302, 1402 may be threaded. In the depicted example, the knuckle 108" has three channels 1140, for receiving three screws, pins or rivets. As the reader will understand, a different number of screws, pins or rivets could be used as required.

As also shown in FIGS. 13-14, each of the first spine 102*a* and the second spine 102*b* includes a concave curved abutment surface 1304, 1404. The concave abutment surface 1304, 1404 extends the full length of each spine 102*a*, 102*b*, and has a radius of curvature that is generally equal to, or slightly larger than, a radius of curvature of an external surface 1103 of the knuckle 104". For example, the outer surface 1103 of the knuckle 104" may have a radius of curvature of 13.5 mm, while the curved abutment surface 1304, 1404 has a radius of curvature of 14 mm.

Figure 15A:
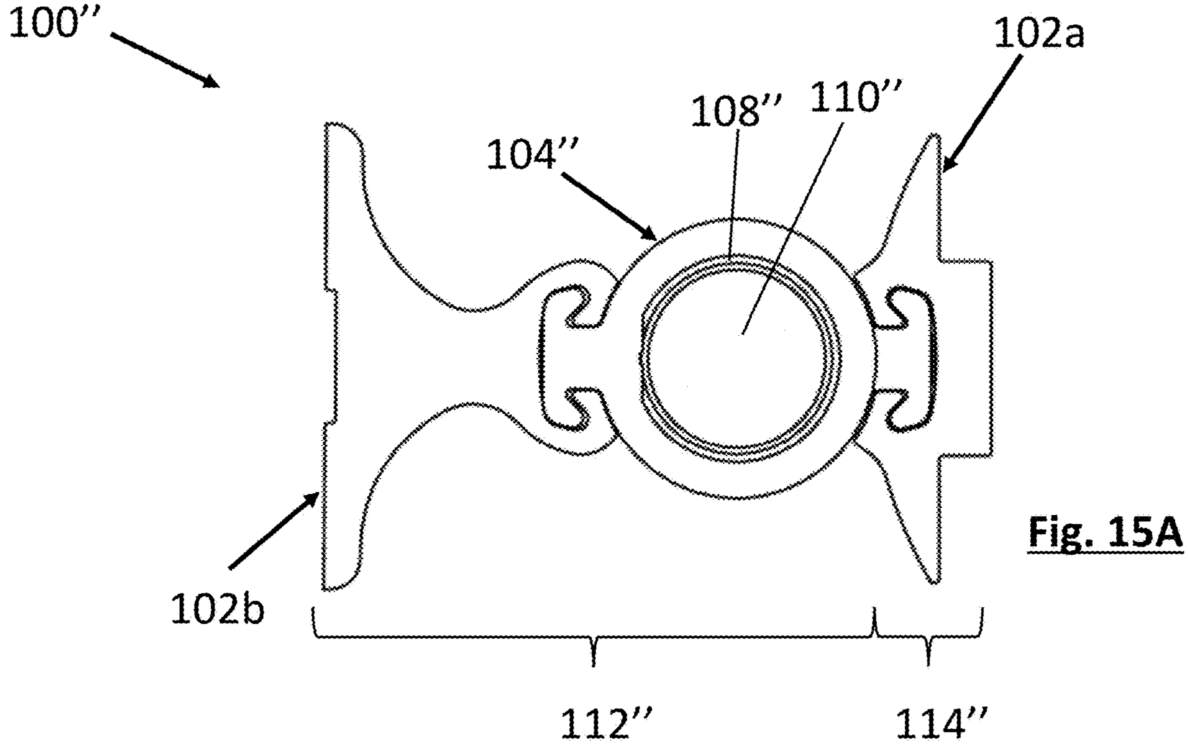
FIGS. 15A and 15B respectively show an end-view and a side-view of an assembled sliding joint, which includes the knuckle of FIGS. 11A-11B, the bushing of FIG. 12, the first spine of FIG. 13, and the second spine of FIG. 14.

Turning now to FIG. 15A, we see an end-view of an assembled continuous hinge 100" comprising the knuckle 104" of FIGS. 11A-11B; the bushing 108" of FIG. 12; the first spine 102*a* of FIG. 13; and the second spine 102*b* of FIG. 14. As can be seen, the bushing 108" is inserted into the knuckle 104", and pin 110" is inserted through the bore of the bushing 108". Additionally, the tail 1102 of the knuckle 104" is inserted into the second spine 102*b*, while the outer surface 1103 of the knuckle 104" abuts the concave abutment surface 1304 of the first spine 102*a*. Accordingly, gaps and ligature points are avoided, but the first spine 102*a* is nonetheless capable of pivoting relative to the knuckle 104". As shown in the view of FIG. 15A, the second spine 102*b* and the knuckle 104" shown comprise a first hinge member 112", while the first spine 102*a* comprises a second hinge member 114". The first and second hinge members 112", 114" are pivotally coupled to each other. the tail 1100 of the knuckle 104" is received within the socket 1114 of the second spine 102*b*; and the outer curved surface of the knuckle 104" abuts the concave curved surface 1304 of the first spine 102*a*.

Figure 15B:
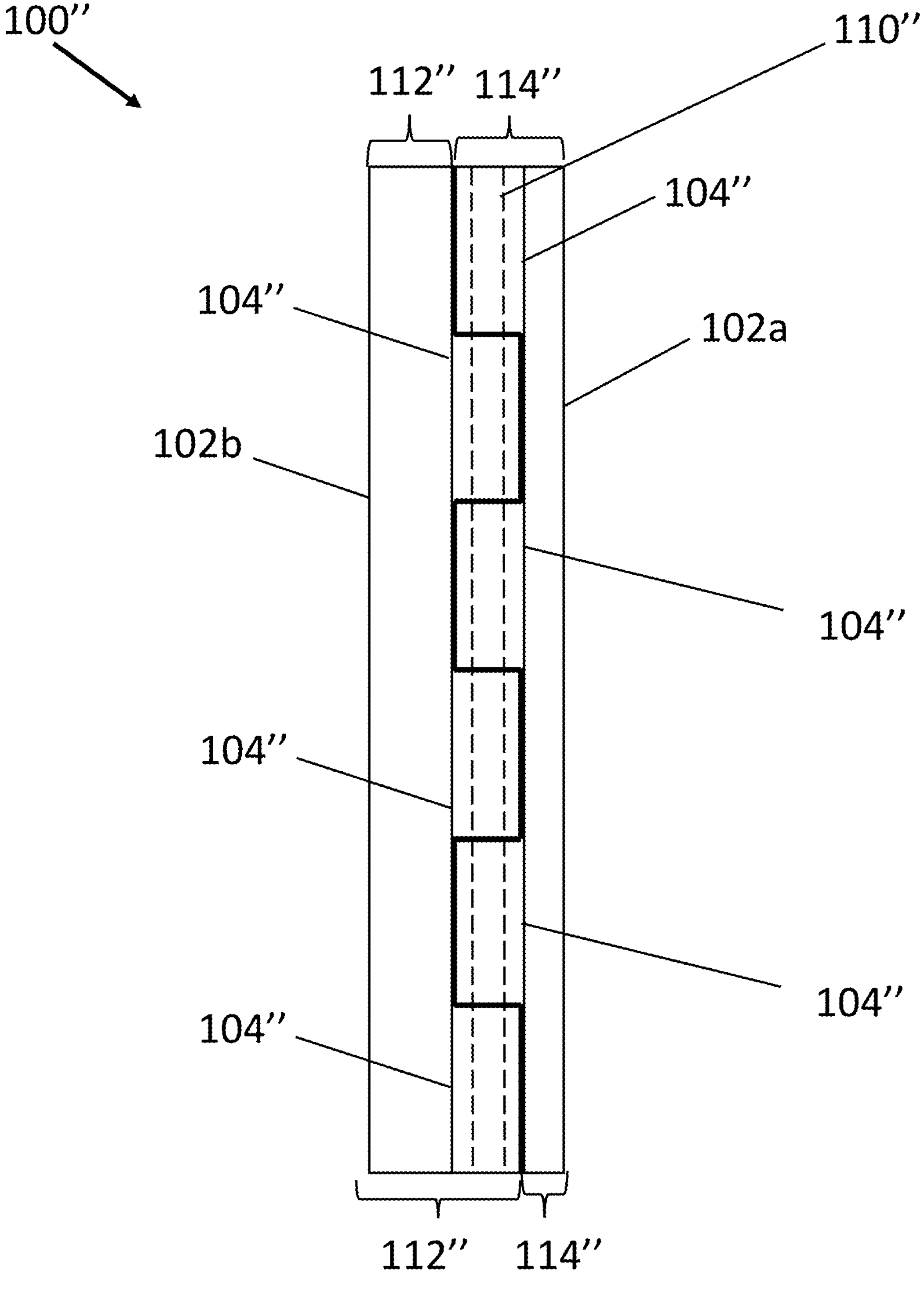

As the reader will understand, because the knuckle 108" directly abuts the first spine 102*a* as described above, the bridging members 106 from FIG. 2 above can be dispensed with. As shown in FIG. 15B, three knuckles 108" are attached to the second spine 102*b* to form the first hinge member 112"; and three knuckles 108" are attached to the first spine 102*a* to form the second hinge member 114". No bridging members are present or required. The three knuckles 108" of the first hinge portion 112" are interdigitated with the three knuckles 108" of the second hinge portion 114". As shown in FIG. 15*b*, the use of interdigitating knuckles 104" with a common pin 110" pivotally secures the first and second hinge members 112", 114" together.

Beneficially, the sliding joint is also entirely concealed in the assembled joint as shown in FIG. 15A. Accordingly, ligature points are avoided.

Fabrication

A method of fabricating a continuous hinge (such as the continuous hinge 100, or the continuous hinge 100', or the continuous hinge 100") will now be described, with reference to FIG. 9.

At step 900, the spines 102/102'/102*a*/102*b* are formed by aluminium extrusion. At step 902, the aluminium spines are then cut to size. In some examples, both spines 102/102' are cut from a single extruded piece.

At step 904, the knuckles 104/104'/104" are formed by aluminium extrusion. At step 906, the aluminium knuckles are then cut to size. Multiple of the aluminium knuckles are cut from a single extruded piece. In some examples, all of the knuckles are cut from a single extruded piece.

At step 908, the bridging members 106/106' are formed by aluminium extrusion. At step 910, the bridging members are then cut to size. Multiple of the bridging members are cut from a single extruded piece. In some examples, all of the bridging members are cute from a single extruded piece. This step is omitted for the continuous hinge 100".

At step 912, the first hinge portion 112/112' is assembled by 'threading' hinge portions and bridging members alternately along the first sliding joint profile one of the spines. Regarding the first hinge portion 112", step 912 comprises threading knuckles 104" along the second spine 102*b*, arranging the knuckles 104" along the second spine 102*b* so that they're equally spaced from one another; and securing them in place using screws, pins or rivets.

At step 914, the second hinge portion 114/114' is assembled by similarly 'threading' hinge portions and bridging members alternately along the first sliding joint profile of the other of the spines. Regarding the second hinge portion 114", step 912 comprises threading knuckles 104" along the first spine 102*a*, arranging the knuckles 104" along the first spine 102*a* so that they're equally spaced from one another; and securing them in place using screws, pins or rivets.

At step 916, the continuous hinge 100/100'/100" is assembled by arranging the first and second hinge portions such that their knuckles interdigitate; and passing a pin 110/110'/110" through a single channel formed through the knuckles (i.e. defined by the aligned bores of the knuckles). Bushings (where used) are placed between adjacent knuckles. In the case of the continuous hinge 100", one bushing 108" is affixed to each end of each knuckle 104".

Figure 9:
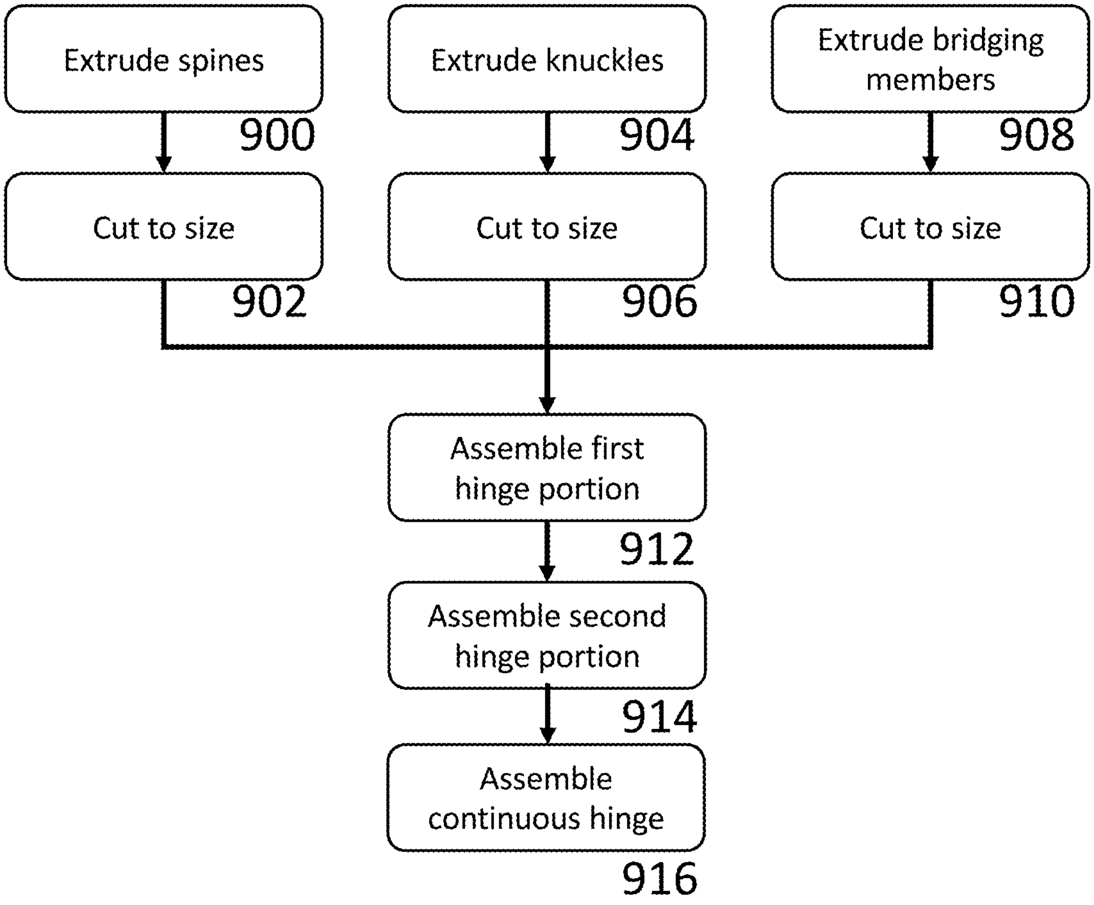
FIG. 9 is a flow chart illustrating a manufacturing method according to the third aspect.

In FIG. 9, fabrication of the spines, knuckles and bridging members are shown as being performed in parallel. This leads to manufacturing efficiencies when performed on a large scale. However, in smaller manufacturing plants, these steps may be performed sequentially.

It is to be understood that the above description is intended to be illustrative, and not restrictive. Many other implementations will be apparent to those of skill in the art upon reading and understanding the above description. For example, the constituent parts could be manufactured by 3D printing, such as additive manufacturing, rather than by aluminium extrusion. Although the present disclosure has been described with reference to a specific example implementation, it will be recognized that the disclosure is not limited to the implementations described, but can be practiced with modification and alteration insofar as such modification(s) and alteration(s) remain within the scope of the appended claims. Further, features of the continuous hinge 100, the double-action continuous hinge 100', and the continuous hinge 100" can be combined, insofar as such a combination is technically possible. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A continuous hinge comprising:

a first hinge portion comprising a first plurality of knuckles removably attached to a first spine, wherein the first spine is a first planar plate and comprises:

a first planar surface located on a first side of the first planar plate and a second surface that includes one or more first sockets located on a second side of the first planar plate that is opposite to and parallel with the first planar surface, wherein the first plurality of knuckles comprises one or more first tails such that the first spine attaches to the first plurality of knuckles when the one or more first tails are received in the one or more first sockets; and a second hinge portion comprising a second plurality of knuckles removably attached to a second spine, wherein the second spine is a second planar plate comprising:

a third planar surface located on a third side of the second planar plate and a fourth surface that includes one or more second sockets located on a fourth side of the second planar plate that is opposite to and parallel with the third planar surface, wherein the second plurality of knuckles comprises one or more second tails such that the second spine attaches to the second plurality of knuckles when the one or more second tails are received in the one or more second sockets, and wherein, when the continuous hinge is assembled, the second plurality of knuckles are interdigitated with and pivotally coupled to the first plurality of knuckles such that the second spine is moveable relative to the first spine into a closed position in which the first planar surface abuts the third planar surface.

2. The continuous hinge of claim 1, wherein each knuckle of the first plurality of knuckles and the second plurality of knuckles comprises a generally cylindrical barrel.

3. The continuous hinge of claim 1, wherein each knuckle of the first plurality of knuckles and the second plurality of knuckles are substantially identical to one another.

4. The continuous hinge of claim 1, wherein each knuckle of the first plurality of knuckles and the second plurality of knuckles has a substantially uniform cross-sectional profile.

5. The continuous hinge of claim 1, further comprising a pin passing through the first plurality of knuckles and the second plurality of knuckles to pivotally couple the first hinge portion to the second hinge portion.

6. The continuous hinge of claim 1, wherein each of the first spine and the second spine has a uniform cross-sectional profile.

7. The continuous hinge of claim 1, wherein each knuckle of the first plurality of knuckles and the second plurality of knuckles comprises at least one bushing to prevent relative rotation of each knuckle and the at least one bushing.

8. A method of manufacturing the continuous hinge according to claim 1, the method comprising:

forming constituent parts of the continuous hinge by extrusion; and assembling the continuous hinge from the constituent parts.

9. The method of claim 8, wherein the constituent parts comprise the first plurality of knuckles and the second plurality of knuckles, and wherein the extrusion comprises:

extruding a single piece having a uniform cross-sectional knuckle profile; and separating the single piece into the first plurality of knuckles and the second plurality of knuckles.

10. A continuous hinge comprising:

a first hinge portion comprising a first plurality of knuckles removably attached to a first spine, wherein the first spine is a first planar plate and comprises:

a first planar surface located on a first side of the first planar plate and a second surface that includes one or more first tails located on a second side of the first planar plate that is opposite to and parallel with the first planar surface, wherein the first plurality of knuckles comprises one or more first sockets such that the first spine attaches to the first plurality of knuckles when the one or more first tails are received in the one or more first sockets; and a second hinge portion comprising a second plurality of knuckles removably attached to a second spine, wherein the second spine is a second planar plate comprising:

a third planar surface located on a third side of the second planar plate and a fourth surface that includes one or more second tails located on a fourth side of the second planar plate that is opposite to and parallel with the third planar surface, wherein the second plurality of knuckles comprises one or more second sockets such that the second spine attaches to the second plurality of knuckles when the one or more second tails are received in the one or more second sockets, and wherein, when the continuous hinge is assembled, the second plurality of knuckles are interdigitated with and pivotally coupled to the first plurality of knuckles such that the second spine is moveable relative to the first spine into a closed position in which the first planar surface abuts the third planar surface.

* * * * *